(12) United States Patent
Fisher et al.

(10) Patent No.: US 6,879,728 B1
(45) Date of Patent: Apr. 12, 2005

(54) MULTIPLE IMAGE HARMONIZATION SYSTEM

(75) Inventors: Clay Harvey Fisher, Belmont, CA (US); Neal Jacob Manowitz, Mahwah, NJ (US)

(73) Assignees: Sony Corporation, Takyo (JP); Sony Electrronics, Park Ridge, NJ (US)

( * ) Notice: Subject to any disclaimer, the term of this patent is extended or adjusted under 35 U.S.C. 154(b) by 561 days.

(21) Appl. No.: 09/718,980

(22) Filed: Nov. 21, 2000

Related U.S. Application Data

(60) Provisional application No. 60/181,777, filed on Feb. 11, 2000.

(51) Int. Cl.[7] .................................................. G06K 9/40
(52) U.S. Cl. ........................ 382/254; 382/167; 382/274; 382/275; 358/1.2; 358/3.26; 358/3.27
(58) Field of Search ................................ 382/167, 274, 382/275, 284, 294, 299, 151, 171, 190, 282, 287, 291, 293, 295; 358/1.2, 3.26, 3.27, 518, 519, 520, 537, 538, 540, 450; 348/584, 598

(56) References Cited

U.S. PATENT DOCUMENTS

| | | | | |
|---|---|---|---|---|
| 4,485,409 A | * | 11/1984 | Schumacher | ................ 358/479 |
| 4,902,128 A | * | 2/1990 | Siebecker et al. | ....... 356/152.1 |
| 5,193,000 A | * | 3/1993 | Lipton et al. | ................ 348/43 |
| 5,561,745 A | | 10/1996 | Jackson et al. | |
| 5,611,028 A | * | 3/1997 | Shibasaki et al. | ............ 345/594 |
| 5,694,331 A | * | 12/1997 | Yamamoto et al. | .......... 345/428 |
| 6,083,158 A | * | 7/2000 | Bearman et al. | ............. 600/323 |
| 6,097,389 A | | 8/2000 | Morris et al. | |
| 6,112,226 A | | 8/2000 | Weaver et al. | |
| 6,123,362 A | | 9/2000 | Squilla et al. | |
| 6,169,544 B1 | | 1/2001 | Onoda | |
| 6,222,947 B1 | | 4/2001 | Koba | |
| 6,324,545 B1 | | 11/2001 | Morag | |
| 6,396,963 B2 | | 5/2002 | Shaffer et al. | |
| 6,434,579 B1 | | 8/2002 | Shaffer et al. | |
| 6,437,306 B1 | * | 8/2002 | Melen | ...................... 250/208.1 |
| 6,522,351 B1 | * | 2/2003 | Park | ............................. 348/51 |
| 6,577,760 B1 | * | 6/2003 | Ohta et al. | ................... 382/167 |
| 6,590,586 B1 | | 7/2003 | Swenton-Wall et al. | |

OTHER PUBLICATIONS

Yagawa et al., "The Digital Album: A Personal File–tainment System", Proceedings of Multimedia '96, pp. 433–439.

* cited by examiner

*Primary Examiner*—Bhavesh M. Mehta
*Assistant Examiner*—Yosef Kassa
(74) *Attorney, Agent, or Firm*—Blakely, Sokoloff, Taylor & Zafman LLP

(57) ABSTRACT

A computer system and computerized method of harmonizing a plurality of images is disclosed. First a plurality of images are selected. Next, a plurality of characteristics of each one of the plurality of images are evaluated. Then, at least one of the plurality of characteristics is selected to harmonize and the selected characteristic is harmonized in at least one of the plurality of images. Finally, the harmonized image or images are output.

21 Claims, 2 Drawing Sheets

MULTIPLE IMAGE HARMONIZATION SYSTEM

RELATED APPLICATIONS

This application claims the benefit of U.S. Provisional Application No. 60/181,777, entitled: MULTIPLE IMAGE HARMONIZATION SYSTEM, filed Feb. 11, 2000.

FIELD OF THE INVENTION

The present invention is related to electronic image analysis and processing and more specifically to image harmonization.

COPYRIGHT NOTICE/PERMISSION

A portion of the disclosure of this patent document may contain material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 1999, Sony Electronics, Inc., All Rights Reserved.

BACKGROUND OF THE INVENTION

Often when two or more images are placed in close proximity such that the images are visible to the human eye simultaneously, one or more of the images may appear to not "fit in" or in some manner are incompatible with the other images. This incompatibility can often occur regardless of subject matter or viewing angle or perspective of the image. This incompatibility is often due to differences in various characteristics of each one of the images. Some examples of the characteristics include color balance, sharpness, histograms, white balance, resolution, size, color noise, brightness, contrast, luminosity, digital artifacts and analog artifacts. If any one or more of these characteristics are sufficiently different from one image to the next, the one different image can be detected by the human eye as being incompatible with the other images.

SUMMARY OF THE INVENTION

A system and method of harmonizing a plurality of images is disclosed. First a plurality of images are selected. Next, a plurality of characteristics of each one of the plurality-of-images are evaluated. Then; at least one of the plurality of characteristics is selected to harmonize and the selected characteristic is harmonized in at least one of the plurality of images. Finally, the harmonized image or images are output.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

BRIEF DESCRIPTION OF THE DRAWINGS

The present invention is illustrated by way of example and not limitation in the figures of the accompanying drawings in which like references indicate similar elements.

DETAILED DESCRIPTION

A system and method of harmonizing a plurality of images is disclosed. First a plurality of images are selected. Next, a plurality of characteristics of each one of the plurality of images are evaluated. Then, at least one of the plurality of characteristics is selected to harmonize and the selected characteristic is harmonized in at least one of the plurality of images. Finally, the harmonized image or images are output.

When displaying two or more images together i.e. such as on a web page, in printed photo albums, hanging on walls, etc., the images often appear, to the human eye, to appear as though they do not belong together or are in some manner incompatible. This appearance is often because of differences in one or more of a plurality of characteristics between the images. Examples of the plurality of characteristics include color balance, sharpness, histogram differences, white balance, resolution, size, color noise, brightness, digital artifacts and analog artifacts, contrast, luminosity and other characteristics well known to those skilled in the art. One intended advantage of the present invention is to improve the compatibility of a plurality of images when the images are displayed in close proximity.

Figure 1A:
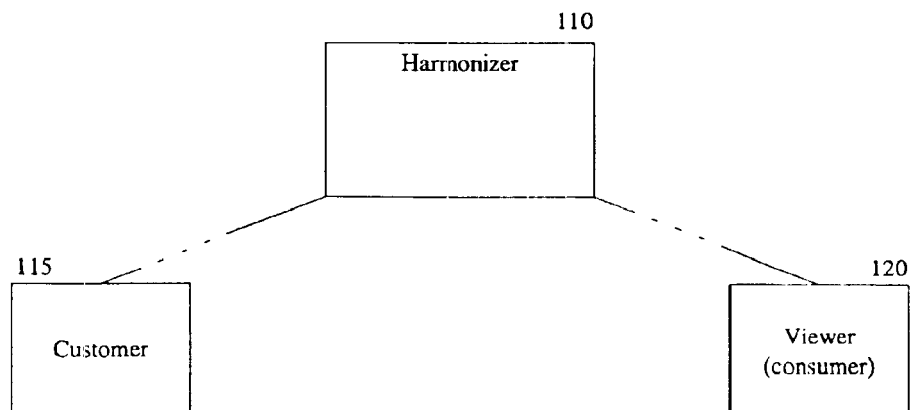
FIGS. 1a and 1b-illustrate embodiments of an environment which can perform the image harmonizing process of the present invention.

FIG. 1A illustrates a simplified block diagram of one embodiment of a system for harmonizing a plurality of images. In this embodiment, an image harmonizer 110 interfaces with a customer 115 and a consumer 120. The harmonizer 110 can be a stand alone computer or a server coupled to a computer network to enable the consumer 120 and the customer 115 to access information at the harmonizer 110. A customer 120 could load data such as a plurality of images to the harmonizer 110 either directly or via the electronic network such as the internet or some other electronic network. The harmonizer 110 then harmonizes the image data. A consumer 120 can then access the harmonized image data from the harmonizer 110. In this embodiment, the harmonizer 110 provides an image harmonizing service for the customer 115 and the consumer 120.

For an alternative embodiment, the harmonizer 110 could be a image harmonizer service accessible through a website accessible via the internet where the customer 115 provides the image data to the harmonizer 110 and the consumer 120 uses the harmonized image data. For one embodiment, the customer 115 pays the harmonizer 110 for the image harmonizing service. For another embodiment, the consumer 120 pays the harmonizer for the image harmonization service. For yet another embodiment, the consumer 120 pays the customer 115 for the harmonized image data It will be appreciated that various compensation schemes can be implemented by the server owner including as subscription a service, one-time charges, or session time without departing from the scope of the invention. In addition, the owner of the server may obtain revenue from banner advertisements that are displayed to the customer 115 and/or the consumer 120 during the processing of the input images when the image harmonizer 110 is harmonizing the image data Such banner ads can be targeted to the user based on the problems identified in the images, e.g. an image that is a low resolution or coarse image could cause an advertisement for higher resolution camera or scanner systems to appear.

For another embodiment, the images can be input via an electronic imaging device such as a video camera or an electronic or digital, still image camera or a scanner or selected from a database of image data such as a website or other computer readable media.

Figure 1B:
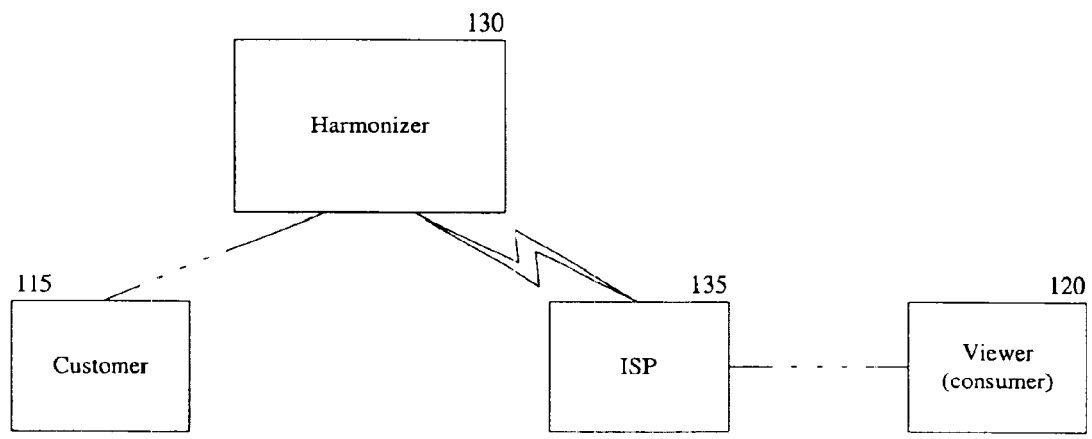

In one embodiment, as shown in FIG. 1B, the image harmonizer 130 is part of or coupled to an ISP (Internet Service Provider) 135 to provide content over the internet. It is readily apparent that the present invention is not limited to Internet access and Internet web-based cites; directly coupled and private networks are also contemplated.

Figure 1C:
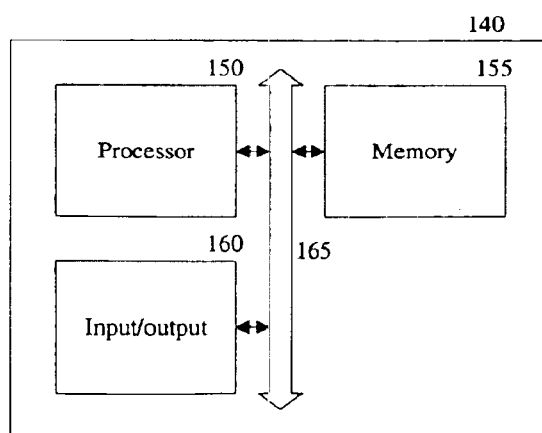
FIG. 1c-illustrates one embodiment of a system which can be used in the system of FIGS. 1a and 1b.

One embodiment of an image harmonizer 140, is illustrated in FIG. 1C. The harmonizer 140, in one embodiment, includes a processor 150, memory 155, a system bus 165 and input/output capability 160. The memory 155 is configured to store instructions and data which when executed by the processor 150 perform the method described herein. The memory may also store the content and revenue information used in the process described herein. Input/output and related content components 160 include a delivery of content/related content, display of content/related content portion of content/related content or a representation of the content.

The description of FIGS. 1B–C is intended to provide an overview of computer hardware and other operating components suitable for implementing the invention, but is not intended to limit the applicable environments. It will be appreciated that the computer system 140 is one example of many possible computer systems, which have different architectures. A typical computer system will usually include at least a processor, memory, and a bus coupling the memory to the processor. One of skill in the art will immediately appreciate that the invention can be practiced with other computer system configurations, including multiprocessor systems, minicomputers, mainframe computers, and the like. The invention can also be practiced in distributed computing environments where tasks are performed by remote processing devices that are linked through a communications network.

Figure 2:
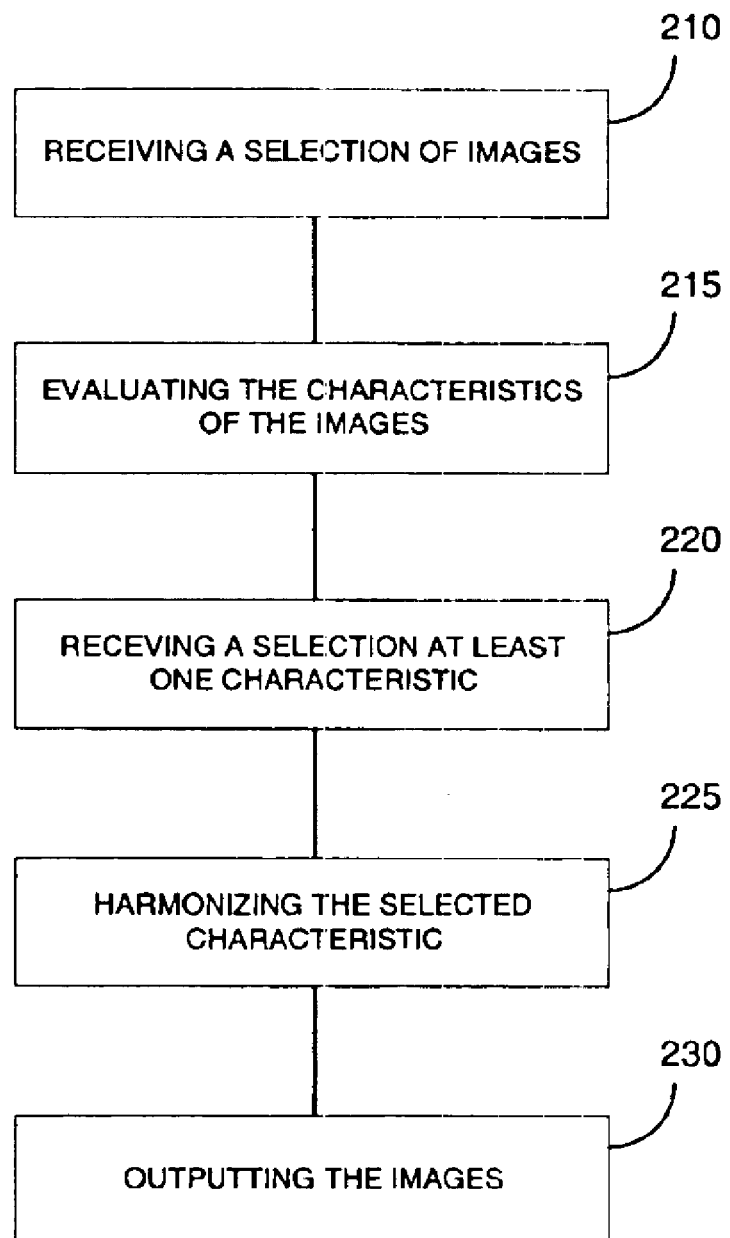
FIG. 2-illustrates a flow diagram of a harmonizing process of the present invention.

One embodiment of the present invention is a method of harmonizing a plurality of images as illustrated in FIG. 2. A plurality of images are selected in block 210. In block 215, the characteristics of each one of the selected images are evaluated. The characteristics include color balance, sharpness, histogram differences, white balance, resolution, size, color noise, brightness, digital artifacts and analog artifacts and other characteristics. At least one of the characteristics is selected for harmonization in block 220. The selected characteristic is harmonized in the selected image or images so that the images appear more harmonized in block 225. The harmonized images are output in block 230. It will be further appreciated that the instructions represented by the blocks in FIG. 2 are not required to be performed in the order illustrated, and that all the processing represented by the blocks may not be necessary to practice the invention.

For an alternative embodiment, a level of harmonization can be selected or limited so that a particular characteristic of an image will not be changed more than a selected amount or level. For another embodiment, one or more of the input images are selected as not being modified. The other images are then modified or adjusted so as to harmonize more with the characteristics of the selected, non-modified images. For still another embodiment, the selected images are harmonized and the non-selected images are not harmonized or otherwise modified.

One embodiment includes a method of harmonizing color data of a plurality of images by adjusting the color characteristics of the plurality of images to make the images more compatible. First, two or more images are selected. Next, the color data of each image is analyzed. Color data includes brightness, contrast, luminosity, and other characteristics that effect the appearance of color in an image. The color data is then compared. Next, harmonized color data is determined by selecting one characteristic of color data and the best compromise such as an average or a minimum or maximum value of that characteristic is determined. Next, a color transform is created for each image. The color transform then adjusts the original color data of each image to be consistent with the harmonized color data. Next the color transforms are applied to each image. The resulting images are adjusted to be more alike in their color characteristics.

For one example the brightness value of each image is determined, and then an average brightness value is calculated as the harmonized color data. Then, the brightness value of each color transform for each image is adjusted to the harmonized brightness value. Next, the color transforms are applied to each image to adjust the brightness of each of the images and the adjusted images are output.

For alternative embodiments, the level of a selected characteristic can be selected or the level of the characteristic of one image can be selected. For example, a plurality of images are input into the harmonizer, one image is selected, then the brightness of each one of the plurality of images is determined. Next, the brightness of each one of the non-selected images is adjusted to the brightness of the selected image.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computerized method comprising:

receiving a plurality of images;

evaluating a plurality of characteristics of each one of the plurality of images;

receiving a selection of at least one of the plurality of characteristics;

harmonizing the selected at least one of the plurality of characteristics in at least one of the plurality of images; and outputting the plurality of images including the harmonized at least one of the plurality of images, wherein harmonizing the selected characteristic in at least one of the plurality of images includes:

determining a best compromise of the selected characteristic;

creating a transform for each one of the plurality of images;

adjusting the selected characteristic in each of the transforms; and applying each one of the adjusted transforms to the at least one of the plurality of images.

2. The computerized method as recited in claim 1, wherein the characteristics of each one of the plurality of images include at least one of a group consisting of color balance, sharpness, histogram differences, white balance, resolution, size, color noise, brightness, digital artifacts and analog artifacts, contrast and luminosity.

3. The computerized method as recited in claim 1, wherein the best compromise includes one of a group consisting of:

an average value of the selected characteristic;

a minimum value of the selected characteristic; and a maximum value of the selected characteristic.

4. The computerized method as recited in claim 1, wherein the best compromise includes a selected level of the selected characteristic.

5. The computerized method as recited in claim 1, wherein the plurality of images received from at least one of a group of sources consisting of:
   an electronic imaging device;
   a video camera;
   a digital camera;
   a scanner; and
   a database of image data stored on computer readable media.

6. The computerized method as recited in claim 1, further comprising:
   obtaining compensation from a user for harmonizing a plurality of images.

7. The computerized method as recited in claim 1, further comprising:
   displaying an advertisement to a user.

8. A computer readable medium having computer-executable instructions to cause a computer to perform a method comprising:
   receiving a plurality of images;
   evaluating a plurality of characteristics of each one of the plurality of images;
   receiving a selection of at least one of the plurality of characteristics;
   harmonizing the selected characteristic in at least one of the plurality of images; and
   outputting the plurality of images including the harmonized at least one of the plurality of images,
   wherein harmonizing the selected characteristic in at least one of the plurality of images includes:
   determining a best compromise of the selected characteristic;
   creating a transform for each one of the plurality of images;
   adjusting the selected characteristic in each of the transforms; and
   applying each one of the adjusted transforms to the at least one of the plurality of images.

9. The computer readable medium as recited in claim 8, wherein the characteristics of each one of the plurality of images include at least one of a group consisting of color balance, sharpness, histogram differences, white balance, resolution, size, color noise, brightness, digital artifacts and analog artifacts, contrast and luminosity.

10. The computer readable medium as recited in claim 8, wherein the best compromise includes one of a group consisting of:
   an average value of the selected characteristic;
   a minimum value of the selected characteristic; and
   a maximum value of the selected characteristic.

11. The computer readable medium as recited in claim 8, wherein the best compromise includes a selected level of the selected characteristic.

12. The computer readable medium as recited in claim 8, wherein the plurality of images received from at least one of a group of sources consisting of:
   an electronic imaging device;
   a video camera;
   a digital camera;
   a scanner; and
   a database of image data stored on computer readable media.

13. The computer readable medium as recited in claim 8, further comprising:
   obtaining compensation from a user for harmonizing a plurality of images.

14. The computer readable medium as recited in claim 8, further comprising:
   displaying an advertisement to a user.

15. A automatic image harmonizing system comprising:
   a processor;
   a memory coupled to the processor through a bus;
   an input and output device coupled to the bus;
   an image harmonizing module executed by the processor to cause the processor to receive a plurality of images, evaluate a plurality of characteristics of each one of the plurality of images, receive a selection of at least one of the plurality of characteristics, harmonize the selected characteristic in at least one of the plurality of images, and output the plurality of images including the at least one of the plurality of images,
   wherein harmonize the selected characteristic in at least one of the plurality of images includes:
   determine a best compromise of the selected characteristic;
   create a transform for each one of the plurality of images;
   adjust the selected characteristic in each of the transforms; and
   apply each one of the adjusted transforms to the at least one of the plurality of images.

16. The automatic image harmonizing system as recited in claim 15, wherein the characteristics of each one of the plurality of images include at least one of a group consisting of color balance, sharpness, histogram differences, white balance, resolution, size, color noise, brightness, digital artifacts and analog artifacts, contrast and luminosity.

17. The automatic image harmonizing system as recited in claim 15, wherein the best compromise includes one of a group consisting of:
   an average value of the selected characteristic;
   a minimum value of the selected characteristic; and
   a maximum value of the selected characteristic.

18. The automatic image harmonizing system as recited in claim 15, wherein the best compromise includes a selected level of the selected characteristic.

19. The automatic image harmonizing system as recited in claim 15, wherein the plurality of images received from at least one of a group of sources consisting of:
   an electronic imaging device;
   a video camera;
   a digital camera;
   a scanner; and
   a database of image data stored on computer readable media.

20. The automatic image harmonizing system as recited in claim 15, wherein the image harmonizing module further causes the processor to display an advertisement to a user.

21. The automatic image harmonizing system as recited in claim 15, wherein the input and output device is coupled to an electronic network.

* * * * *